(12) United States Patent
Kato

(10) Patent No.: US 6,206,529 B1
(45) Date of Patent: Mar. 27, 2001

(54) VEHICLE MIRROR DEVICE

(75) Inventor: Tadayoshi Kato, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/577,572

(22) Filed: May 25, 2000

(30) Foreign Application Priority Data

Jun. 9, 1999 (JP) ................................................ 11-162053

(51) Int. Cl.[7] .................................................. G02B 7/182
(52) U.S. Cl. ........................ 359/871; 359/872; 359/877; 359/841
(58) Field of Search .................... 359/871, 872, 359/877, 841, 862, 508; 248/487

(56) References Cited

U.S. PATENT DOCUMENTS

| | | | |
|---|---|---|---|
| 3,711,179 | * 1/1973 | Takeda | 359/877 |
| 4,234,246 | * 11/1980 | Wunsch et al. | 359/508 |
| 5,846,633 | * 12/1998 | Narazaki et al. | 428/131 |
| 5,909,326 | * 6/1999 | Leonberger | 359/841 |
| 6,133,704 | * 10/2000 | Yoshida et al. | 318/466 |

* cited by examiner

Primary Examiner—Mohammad Sikder
(74) Attorney, Agent, or Firm—Nixon Peabody LLP; Thomas W. Cole

(57) ABSTRACT

A vehicle mirror device is provided in which work for wiring a cord, which is used to supply electric power to an internal mechanism within a mirror visor, and workability can be improved. At a mirror stay of the vehicle mirror device, a through hole is formed in a supporting portion and an insertion hole is formed in a mounting portion. The insertion hole is open at an end portion of the mounting portion. A cover which closes the opening portion of the insertion hole is provided. With the stay cover removed, the cord which is used to supply electric power to the internal mechanism within the mirror visor is inserted through the through hole and into the insertion hole from the opening portion thereof. Then, the stay cover is mounted to close the opening portion of the insertion hole. As a result, the cord can be wired from the internal mechanism to an interior of a vehicle while being held by the insertion hole and the through hole. Accordingly, work for wiring the cord is easy and workability can be improved.

18 Claims, 4 Drawing Sheets

VEHICLE MIRROR DEVICE

BACKGROUND OF THE INVENTION

1. Field of the Invention

The present invention relates to a vehicle mirror device which is provided at a vehicle.

2. Description of the Related Art

A door mirror device provided at a vehicle includes a door mirror visor. The door mirror visor holds a mirror for viewing the region substantially at the rear of a vehicle. An internal mechanism for a mirror surface adjustment and the like is provided within the door mirror visor. A cord, which is used to supply electric power to the internal mechanism, is connected to the internal mechanism.

The vehicle door mirror device also includes a door mirror stay. The door mirror stay has a supporting portion. A plurality of screw holes are formed at the supporting portion. The door mirror stay supports the door mirror visor at the supporting portion by screwing a plurality of screws into the mirror visor. Moreover, a circular through hole is provided in the supporting portion. The cord to the internal mechanism provided within the door mirror visor is inserted through this through hole.

The door mirror stay has a mounting portion. The door mirror stay is mounted to a vehicle at the mounting portion, and the above-described supporting portion protrudes from the mounting portion. A circular supporting hole is formed in the mounting portion, and the cord which has passed through the above-mentioned through hole passes through the supporting hole and is wired to the interior of the vehicle. Therefore, the cord is held by the circular through hole and the circular supporting hole. As a result, the cord is securely held to the door mirror stay.

In such a vehicle door mirror device, the cord from the internal mechanism provided within the door mirror visor passes through the circular through hole formed in the supporting portion of the door mirror stay, and then passes through the circular supporting hole formed in the mounting portion of the door mirror stay so as to be wired to the interior of the vehicle. It is difficult to insert the cord, which has passed through the circular through hole, into the circular supporting hole, and therefore, the work involved in wiring of the cord is difficult and workability is poor.

Further, screws are exposed from the door mirror stay. Accordingly, irregularities are formed by the screw holes and the screws at the door mirror stay, and as a result, problems arise in that noise of cutting the wind is generated while the vehicle is traveling, and the appearance of the vehicle door mirror device is unattractive.

SUMMARY OF THE INVENTION

In view of the aforementioned, an object of the present invention is to provide a vehicle door mirror device in which the work for wiring a cord used to supply electric power to an internal mechanism provided within a door mirror visor is facilitated and workability can be improved.

A vehicle mirror device according to the present invention includes (a) a mirror holding portion having a mirror which is supported therein, and an internal mechanism accommodated within the mirror holding; (b) wiring having opposite ends, with one connected to the internal mechanism, and the other end being for connection to the vehicle electric power supply; and (c) a mirror stay mountable to the vehicle body, and mounted to the mirror holding portion for support thereof, wherein an insertion hole having an opening portion is defined in the mirror stay, through which said wiring extends.

In accordance with the vehicle mirror device of the present invention, the cord, which is used to supply electric power to the internal mechanism provided within a mirror visor, passes through a through hole formed in a supporting portion of the mirror stay and an insertion hole formed in a mounting portion of the mirror stay, and therefore, the cord is wired from the internal mechanism to the interior of a vehicle. Here, the insertion hole is open from an end portion of the mounting portion. When the stay cover is mounted, the opening portion of the insertion hole is closed by the stay cover. Accordingly, the cord cannot be removed from the opening portion of the insertion hole, and therefore, the insertion hole can hold the cord. Because the cord is held by two portions, i.e., by the through hole and the insertion hole which are formed at the mirror stay, the cord can be held securely to the mirror stay.

The insertion hole of the mounting portion is open from the end portion of the mounting portion. Therefore, before mounting of the stay cover, the cord is passed through the through hole of the supporting portion, and is inserted into the insertion hole of the mounting portion from the opening portion thereof. Then, the stay cover is mounted so as to close the opening portion of the insertion hole. As a result, the cord can be held by the through hole and the insertion hole. It is not necessary, as in conventional manner, to insert a cord, which has passed through a circular through hole formed in the door mirror visor, into a circular supporting hole formed at the door mirror stay. The work involved in wiring the cord becomes easy, and workability can be improved.

DESCRIPTION OF THE PREFERRED EMBODIMENTS

Figure 1:
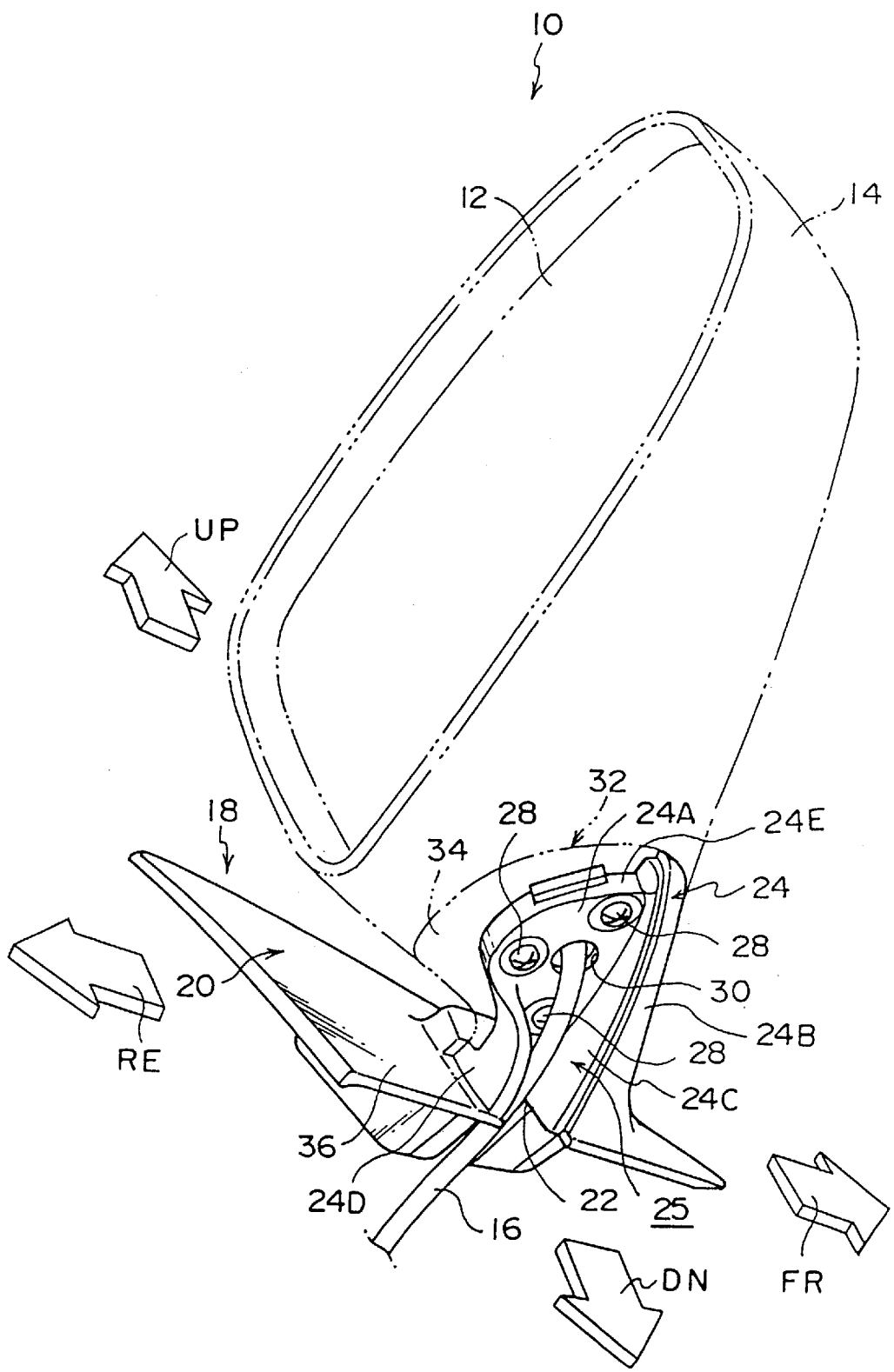
FIG. 1 is a perspective view from a bottom side of a vehicle, with a stay cover being removed, illustrating the whole structure of a vehicle door mirror device in accordance with an embodiment of the present invention.
Figure 2:
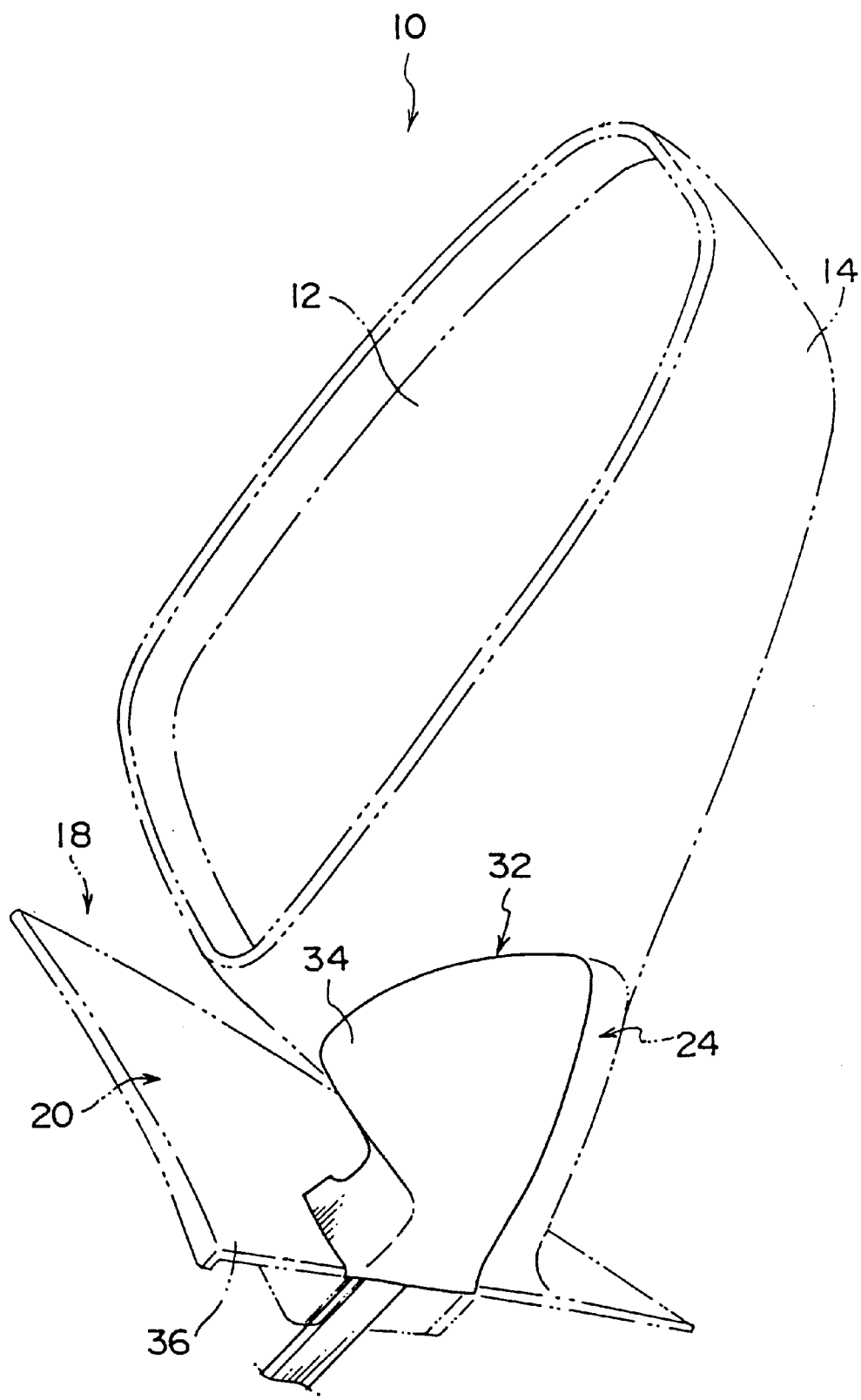
FIG. 2 is a perspective view from a bottom side of a vehicle, with a stay cover being mounted, illustrating the whole structure of the vehicle door mirror device.

The vehicle door mirror device 10 in accordance with an embodiment of the present invention includes a mirror 12 for viewing the region at a rear of a vehicle. The mirror 12 is held by a door mirror visor 14. The door mirror visor 14 is formed in a streamlined configuration such that a width dimension toward a vehicle front (direction shown by the arrow FR) is small, and therefore, noise of cutting the wind caused by the door mirror visor 14 is prevented and a better appearance of the door mirror visor 14 is provided. An internal mechanism (not shown) is provided within the door mirror visor 14. The internal mechanism carries out the mirror surface angular adjustment of the mirror 12, heating of the mirror 12 by a heater for defogging thereof, electric retracting thereof, and the like. A cord 16 is connected to the internal mechanism and the internal mechanism receives electric power by the cord 16.

The vehicle door mirror device 10 also includes a door mirror stay 18 and the door mirror stay 18 has a mounting portion 20. The mounting portion 20 is a substantially triangular board. The door mirror stay 18 is mounted to a vehicle at the mounting portion 20. An insertion hole 22 is provided at the mounting portion 20, which is open like a notch at a lower end portion of the mounting portion 20. The cord 16 which is connected to the above-described internal mechanism is inserted into the insertion hole 22 from the opening portion thereof. Therefore, the cord 16 is passed through the insertion hole 22 and wired to the interior of the vehicle.

Further, the door mirror stay 18 has a supporting portion 24. The supporting portion 24 protrudes like an arm from the mounting portion 20. As shown in FIG. 1, a cutout portion 25 is formed at the supporting portion 24 at the vehicle rear (shown by the arrow RE) side and at the vehicle downward (shown by the arrow DN) side, and therefore, a visor mounting stand 24A is formed. The visor mounting stand 24A is provided with a plurality of (three in the present embodiment) through holes for screws 26. The door mirror stay 18 supports the door mirror visor 14 at the supporting portion 24 by screwing screws 28 into the mirror visor 14 through the through holes. The supporting portion 24 at the vehicle front side (direction shown by the arrow FR) is formed so as to be a streamlined configuration portion to coincide with the streamlined configuration of the above-described door mirror visor 14. Accordingly, noise of cutting the wind caused by the supporting portion 24 of the door mirror stay 18 is prevented and the better appearance of the supporting portion 24 is provided.

A circular through hole 30 is provided at a portion which is a substantially center portion of the mounting stand 24A and is surrounded by the plural holes 26. The cord 16 from the above-described internal mechanism passes through the through hole 30. As described above, the cord 16 from the internal mechanism passes through the insertion hole 22 of the mounting portion 20 and is wired to the interior of the vehicle. Accordingly, the cord 16 passes through, from the internal mechanism, both the through hole 30 of the supporting portion 24 and the insertion hole 22 of the mounting portion 20 to be wired to the interior of the vehicle.

A wall portion 24C which faces toward the rear of the vehicle is formed at the supporting portion 24 by the cutout portion 25. An end portion of the wall portion 24C continues to an inner circumferential wall of the insertion hole 22. A rib 24D projects from the vehicle rear side edge portion of the supporting portion 24 which is opposite to the wall portion 24C of the insertion hole 22 so as to be integral with the supporting portion 24 and the mounting stand 24A and to face the wall portion 24C. Accordingly, the insertion hole 22 is covered with an arm portion of the supporting portion 24 at the vehicle front side thereof, with the mounting stand 24A at the vehicle upward side thereof, and with the rib 24D at the vehicle rear side thereof such that the insertion hole 22 has an opening portion directed downwards relative to the vehicle. As a result, the possibility of rain water flowing over the through hole 30 and the cord 16 is reduced.

Figure 3:
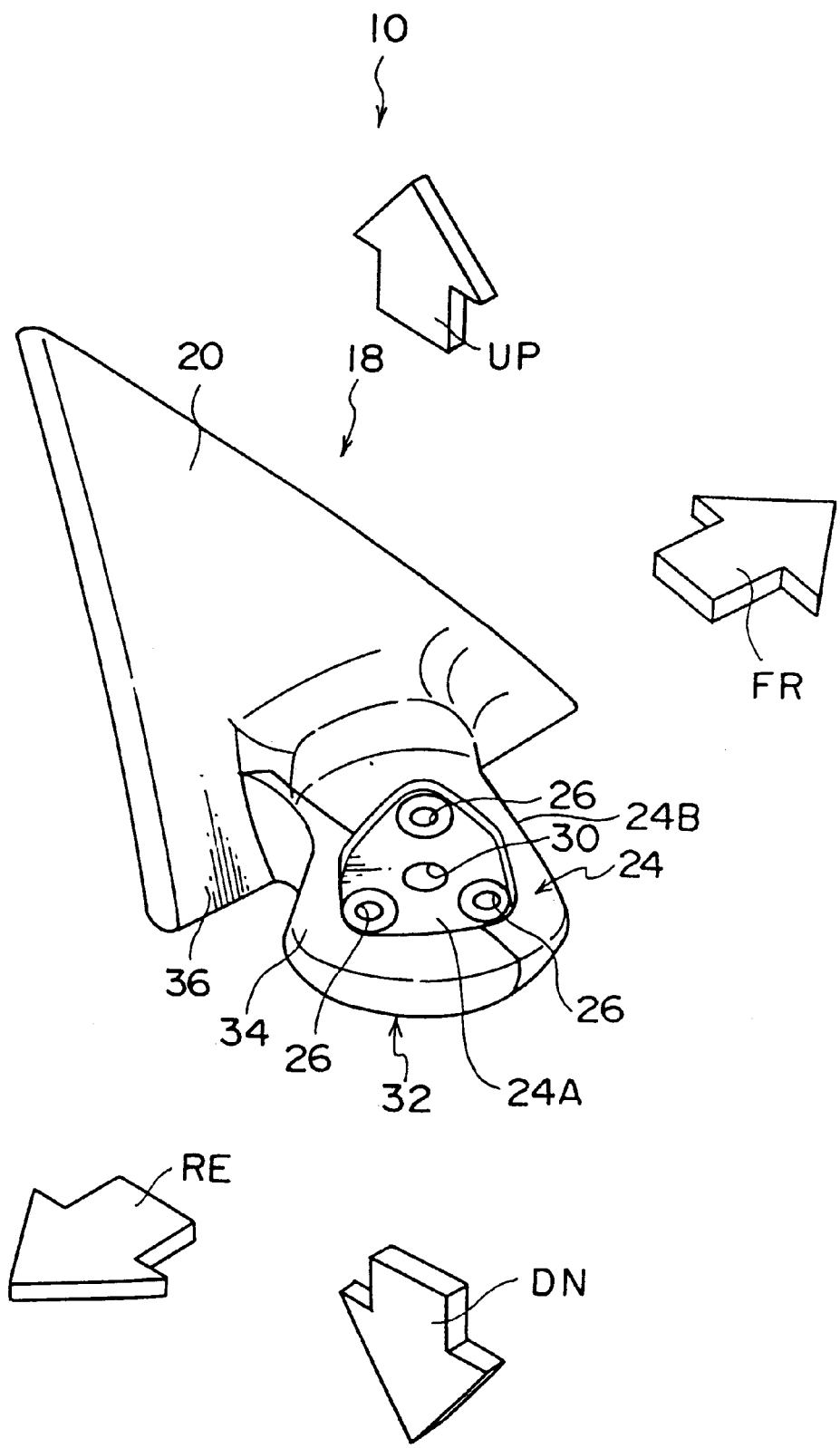
FIG. 3 is a perspective view from above of a vehicle illustrating main portions of the vehicle door mirror device.
Figure 4:
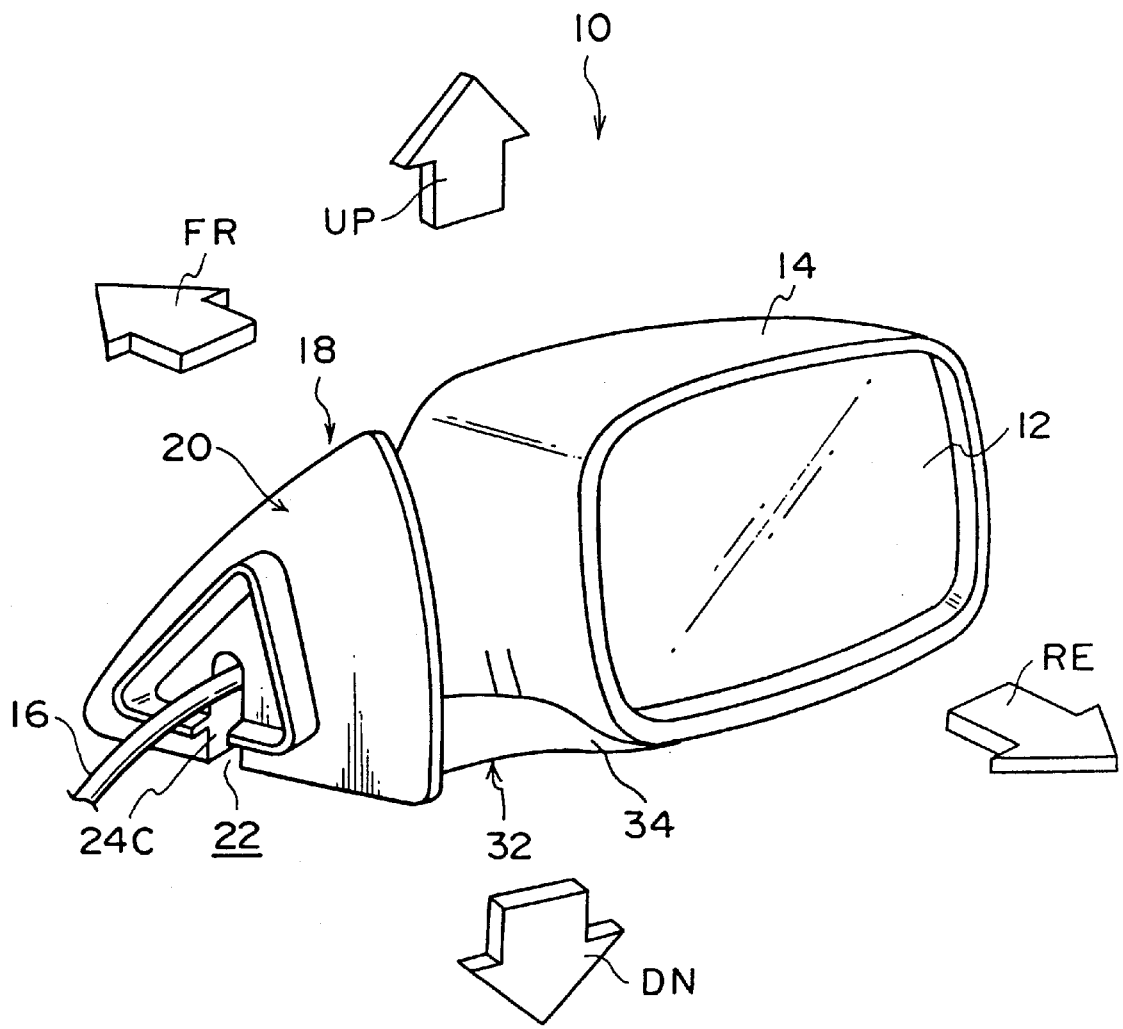
FIG. 4 is a perspective view from a rear of a vehicle illustrating the whole structure of the vehicle door mirror device.

The door mirror stay 18 is provided with a stay cover 32 which is formed in a shell shape. The stay cover 32 covers the cutout portion 25 together with the rib 24D and also covers a surrounding portion 24E of the mounting stand 24A, as shown in FIG. 3, so as to isolate the insertion hole 22 with the opening portion directed downwards relative to the vehicle being closed. Therefore, the above-described cord 16 is prevented from being removed from the opening portion of the insertion hole 22. Moreover, the cutout portion 25 which is a wiring area of the cord 16 is isolated from outside by the stay cover 32. The cutout portion 25 communicates with the inside of the door mirror visor 14 only by the through hole 30 and with the inside of a vehicle only by the insertion hole 22. In addition to the insertion hole 22, the stay cover 32 also covers the above-described cord 16, the through hole 30, screw holes 26, and screws 28. Accordingly, irregularities are prevented from being formed at the door mirror stay 18 by the screw holes 26 and the screws 28.

In order to coincide with the streamlined configuration of the above-described door mirror visor 14, the stay cover 32 is also formed in the streamlined configuration protruded to the vehicle rear side (a protruding portion is referred to as "a convex portion 34" hereinafter). Therefore, the overall configuration of the vehicle door mirror device 10 with the stay cover 32 being mounted to the door mirror stay 18 is formed in a streamlined configuration. Noise of cutting the wind is prevented from being generated by the vehicle door mirror device 10 and the better appearance of the vehicle door mirror device 10 is provided.

In a state of mounting the stay cover 32 to the door mirror stay 18, it is difficult to polish or coat a portion of the mounting portion 20 of the door mirror stay 18 which faces the convex portion 34 because the convex portion 34 of the stay cover 32 becomes an obstruction (the portion is referred to as "an opposed portion 36" hereinafter). However, if the stay cover 32 is removed from the door mirror stay 18, a large space is provided at a side portion of the opposed portion 36 of the mounting portion 20 and therefore, it is easy to carry out polishing, coating or the like upon the opposed portion 36 of the door mirror stay 18. A rotating slide portion is provided between the mounting stand 24A and the door mirror visor 14. The door mirror visor 14 can be rotated by a motor within the door mirror visor 14 relative to the mounting portion 20 and the stay cover 32 from a state shown in FIG. 1 to a position in which the door mirror visor 14 is along a vehicle body.

An operation of the present embodiment will be explained.

In the vehicle door mirror device 10 having the above-described structure, the cord 16 which is used to supply electric power to the internal mechanism provided within the door mirror visor 14, passes through the through hole 30 formed at the supporting portion 24 of the door mirror stay 18 and the insertion hole 22 formed at the mounting portion 20 of the door mirror stay 18, and wired to the inside of a vehicle. The insertion hole 22 is open at an end portion of the mounting portion 20. When the stay cover 32 is mounted, it covers the opening portion of the insertion hole 22 and therefore, the cord 16 cannot be removed from the opening portion of the insertion hole 22. As a result, the cord 16 can be held by the insertion hole 22. Since the cord 16 is held by the through hole 30 and the insertion hole 22 which are formed at the door mirror stay 18, the cord 16 can be securely held to the door mirror stay 18.

The insertion hole 22 of the mounting portion 20 is open at the end portion of the mounting portion 20. Therefore, the cord is passed through the through hole 30 of the supporting portion 24 and is inserted into the insertion hole 22 of the mounting portion 20 from the opening portion thereof before mounting the stay cover 32. Then, the stay cover 32 is mounted so as to cover the opening portion of the insertion hole 22. As a result, the cord 16 can be held by the through hole 30 and the insertion hole 22. It is not necessary, as in conventional manner, to insert a cord which has passed through a circular through hole formed at the door mirror visor into a circular supporting hole formed at the door mirror stay. A wiring operation of the cord 16 becomes easy and workability is improved.

Because the screw holes 26 and the screws 28 are covered with the stay cover 32, irregularities are prevented from being formed at the door mirror stay 18 by the screw holes 26 and the screws 28. Noise of cutting the wind caused by the screw holes 26 and the screws 28 when a vehicle travels is prevented and the better appearance of the door mirror device can be provided.

In a state of mounting the stay cover 32 to the door mirror stay 18, it is difficult to carry out polishing, coating or the like upon the opposed portion 36 of the door mirror stay 18 because the convex portion 34 of the stay cover 32 becomes an obstruction. However, in a state of removing the stay cover 32 from the door mirror stay 18, a large space is provided at a side portion of the opposed portion 36 of the mounting portion 20. Accordingly, by removing the stay cover 32 from the door mirror stay 18, it is easy to carry out polishing or coating of the opposed portion 36 of the door mirror stay 18 and workability can be improved.

What is claimed is:

1. A vehicle mirror device for mounting to a vehicle having an electric power supply, the device comprising:
   (a) a mirror holding portion having a mirror which is supported therein, and an internal mechanism accommodated within said mirror holding;
   (b) wiring having opposite ends, with one connected to the internal mechanism, and the other end being for connection to the vehicle electric power supply;
   (c) a mirror stay mountable to the vehicle body, and mounted to the mirror holding portion for support thereof, wherein an insertion hold having an opening portion is defined in the mirror stay, through which said wiring extends;
   (d) a stay cover mountable to said mirror stay which covers said insertion hold when said stay cover is mounted to the mirror stay, and
   (e) a rib projecting a rim of said insertion hole, wherein said cover covers said rib when said stay cover is mounted to the mirror stay.

2. The vehicle mirror device of claim 1, wherein said mirror stay has a mounting portion and a supporting portion, and said insertion hole is formed in said mounting portion.

3. The vehicle mirror device of claim 2, wherein a through hole is formed in said supporting portion through which wiring extends.

4. The vehicle mirror device of claim 2, wherein a rib projects from a rim of the insertion hole in the supporting portion.

5. The vehicle mirror device of claim 1, wherein said mirror stay has a supporting portion, and a through hole through which wiring extends is formed in said supporting portion, with said stay cover covering said through hole, when said stay cover is mounted to said mirror stay.

6. The vehicle mirror device of claim 5, wherein said stay cover forms a shell, substantially covering the entire supporting portion, when said stay cover is mounted to said mirror stay.

7. The vehicle mirror device of claim 1, wherein said stay cover is formed in a streamlined configuration having a convex portion for directing rearwards relative to the vehicle when said stay cover is mounted to said mirror stay.

8. The vehicle mirror device of claim 1, wherein said opening portion of said insertion hole directs downwards relative to the vehicle when said vehicle mirror device is mounted to a vehicle.

9. The vehicle mirror device of claim 8, wherein said mirror stay has a mounting portion and said insertion hole is formed in said mounting portion.

10. The vehicle mirror device of claim 9, wherein a rib projects from a rim of said insertion hole in the mounting portion.

11. The vehicle mirror device of claim 10, further comprising a stay cover mountable to said mirror stay, which covers said insertion hole and said rib when said stay cover is mounted to said mirror stay.

12. The vehicle mirror device of claim 11, wherein said mirror stay includes a supporting portion, with a through hole defined therein, through which wiring extends.

13. The vehicle mirror device of claim 12, wherein when mounted, said stay cover forms a shell covering substantially all of the supporting portion.

14. The vehicle mirror device of claim 13, wherein said stay cover is formed in a streamlined configuration, having a convex portion for facing rearwards relative to the vehicle when said stay cover is mounted to said mirror stay.

15. The vehicle mirror device of claim 1, wherein the vehicle mirror device is for use with a plurality of screws, and the supporting portion of the mirror stay includes a plurality of through holes for screws defined therein, and by screwing screws into the mirror holding portion through said through holes, said mirror holding portion is supported by said mirror stay and said stay cover covers said screws when mounted to said mirror stay.

16. A vehicle mirror device comprising:
   a mirror holding portion which supports a mirror and in which an internal mechanism is accommodated;
   wiring which connects a vehicle electric power supply and the internal mechanism of said mirror holding portion;
   a mirror stay which is mounted to a vehicle body and said mirror holding portion, supports said mirror holding portion, and has a mounting portion and a supporting portion, and an insertion hole having an opening portion, through which said wiring passes is formed in said mounting portion;
   a stay cover mountable to said mirror stay which covers said insertion hole when said stay cover is mounted to the mirror stay, and
   a rib projecting a rim of said insertion hole, wherein said stay cover covers said rib when said stay cover is mounted to the mirror stay.

17. A vehicle mirror device according to claim 16 wherein said mirror stay has a supporting portion, and said stay cover is formed a shell and substantially covers the entire supporting portion when said stay cover is mounted to said mirror stay.

18. A vehicle door mirror device comprising:
   a mirror visor which holds a mirror for viewing a region at a rear of a vehicle and in which an internal mechanism is provided;
   a door mirror stay which includes a mounting portion which is mounted to a vehicle and a supporting portion which protrudes from said mounting portion, said door mirror stay supporting said mirror visor at said supporting portion;
   a cord which is wired to an interior of a vehicle by being passed from said internal mechanism through a through hole formed in said supporting portion and an insertion hole having an opening portion at an end portion thereof, formed in said mounting portion such that the internal mechanism of said door mirror visor receives electric power via said cord;
   a stay cover which covers said cord, said through hole and said insertion hole with the opening portion closed, and
   a rib projecting a rim of said insertion hole, wherein said stay cover covers said rib when said stay cover is mounted to the mirror stay.

* * * * *